United States Patent
Chang et al.

(10) Patent No.: US 10,887,109 B2
(45) Date of Patent: Jan. 5, 2021

(54) ELECTRONIC DEVICE FOR INCLUDING SIGNATURE IN ELECTRONIC DOCUMENT AND METHOD OF CONTROLLING THE SAME

(71) Applicant: Samsung Electronics Co., Ltd., Gyeonggi-do (KR)

(72) Inventors: Moon Soo Chang, Gyeonggi-do (KR); Kyu Won Kim, Gyeonggi-do (KR); Min Ho Kim, Gyeonggi-do (KR); Jong Hoon Park, Gyeonggi-do (KR); In Jun Son, Gyeonggi-do (KR); Tae In An, Gyeonggi-do (KR); So Hyeon Jeon, Gyeonggi-do (KR); In Myung Choi, Gyeonggi-do (KR); Ji Yoon Park, Gyeonggi-do (KR); Dong Hyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 16/009,409

(22) Filed: Jun. 15, 2018

(65) Prior Publication Data
US 2019/0058596 A1    Feb. 21, 2019

(30) Foreign Application Priority Data
Aug. 17, 2017    (KR) .................. 10-2017-0104433

(51) Int. Cl.
*H04L 9/32*    (2006.01)
*H04L 9/08*    (2006.01)
(Continued)

(52) U.S. Cl.
CPC .......... *H04L 9/3247* (2013.01); *H04L 9/0866* (2013.01); *H04L 9/3228* (2013.01);
(Continued)

(58) Field of Classification Search
CPC ... H04L 9/3247; H04L 9/0866; H04L 9/3228; H04L 9/3231; H04L 2209/72;
(Continued)

(56) References Cited

U.S. PATENT DOCUMENTS

| 6,401,206 B1* | 6/2002 | Khan ................. H04L 9/3231 713/176 |
| 7,178,030 B2* | 2/2007 | Scheidt .............. H04L 9/321 380/259 |

(Continued)

FOREIGN PATENT DOCUMENTS

| KR | 10-2013-0056726 A | 5/2013 |
| KR | 10-2013-0090320 A | 8/2013 |

(Continued)

*Primary Examiner* — Jayesh M Jhaveri
(74) *Attorney, Agent, or Firm* — Cha & Reiter, LLC.

(57) ABSTRACT

Disclosed is an electronic device. The electronic device comprising: a display including a touch screen; a biometric sensor; a communication circuit; a memory; and at least one processor electrically connected to the display, the biometric sensor, the memory, and the communication circuit, wherein the memory stores a plurality of instructions that, when executed, causes the processor to: receive an electronic document from at least one server using the communication circuit; obtain biometric information associated with a user using the biometric sensor; transmit the biometric information associated with the user to the at least one server through the communication circuit; obtain a signature of the user associated with the electronic document using the display; encrypt the obtained signature with specified data associated with the biometric information; and transmit the encrypted signature and at least one of the electronic document and identification information of the electronic document by using the communication circuit.

20 Claims, 9 Drawing Sheets

(51) Int. Cl.
*G06F 21/30* (2013.01)
*G06F 21/32* (2013.01)

(52) U.S. Cl.
CPC ............ *H04L 9/3231* (2013.01); *G06F 21/30* (2013.01); *G06F 21/32* (2013.01); *H04L 2209/72* (2013.01); *H04L 2209/805* (2013.01)

(58) Field of Classification Search
CPC ....... H04L 2209/805; H04L 9/32; H04L 9/08; G06F 21/30; G06F 21/32
See application file for complete search history.

(56) References Cited

U.S. PATENT DOCUMENTS

| | | | |
|---|---|---|---|
| 8,806,582 B2* | 8/2014 | Dietrich | G06F 21/34 726/4 |
| 9,307,028 B2 | 4/2016 | Rakan | |
| 9,485,097 B2 | 11/2016 | Rakan | |
| 9,866,394 B2 | 1/2018 | Alkhalaf | |
| 10,771,256 B2* | 9/2020 | Seegebarth | H04L 63/168 |
| 2004/0236694 A1* | 11/2004 | Tattan | G06F 21/32 705/50 |
| 2012/0192250 A1 | 7/2012 | Rakan | |
| 2014/0222968 A1 | 8/2014 | Rakan | |
| 2014/0365782 A1* | 12/2014 | Beatson | H04L 9/3226 713/186 |
| 2015/0063562 A1 | 3/2015 | Nilsen et al. | |
| 2016/0191251 A1 | 6/2016 | Alkhalaf | |
| 2017/0180988 A1 | 6/2017 | Kim et al. | |
| 2018/0302227 A1* | 10/2018 | Seegebarth | H04L 9/3234 |

FOREIGN PATENT DOCUMENTS

| | | |
|---|---|---|
| KR | 10-1584045 B1 | 1/2016 |
| KR | 10-1598331 B1 | 3/2016 |
| KR | 10-2017-0007068 A | 1/2017 |
| KR | 10-2017-0073927 A | 6/2017 |

* cited by examiner

ELECTRONIC DEVICE FOR INCLUDING SIGNATURE IN ELECTRONIC DOCUMENT AND METHOD OF CONTROLLING THE SAME

CROSS-REFERENCE TO RELATED APPLICATION(S)

This application is based on and claims priority under 35 U.S.C. § 119 to Korean Patent Application No. 10-2017-0104433, filed on Aug. 17, 2017, in the Korean Intellectual Property Office, the disclosure of which is incorporated by reference herein its entirety.

BACKGROUND

1. Field

The present disclosure relates to a user authentication technology.

2. Description of Related Art

An electronic device such as a smartphone can be carried by a user. Other electronic devices, such as a wearable device can be worn on a part of a user's body. As information technology (IT) has been developed, such electronic devices have been multifunctional and may provide various functions, such as replaying music, recording and replaying video, a receiving and playing a digital broadcast, telephone calls, wireless Internet, a short message services (SMS), a multimedia messaging service (MMS), and the like, to the user.

Electronic devices can also authenticate the identity of the user, thereby allowing financial services, which have been performed only offline.

The above information is presented as background information only to assist with an understanding of the present disclosure. No determination has been made, and no assertion is made, as to whether any of the above might be applicable as prior art with regard to the present disclosure.

SUMMARY

An authentication technology using signature authenticates a user by grasping the characteristics of user handwriting. However, the signature may be forged through repetitive practice. Specifically, when entering into a contract or other legal transaction through an electronic document, it is difficult to authenticate the user using their signature due to low reliability. In addition, an authentication technology based on personal identification number (PIN) information can also be compromised by others.

Aspects of the present disclosure may address at least the above-mentioned problems and/or disadvantages and may provide at least the advantages described below. Accordingly, an aspect of the present disclosure may provide a method of authenticating a user by encrypting signature or PIN through biometric authentication.

In accordance with an embodiment of the present disclosure, an electronic device comprises a display including a touch screen; a biometric sensor; a communication circuit; a memory; and at least one processor electrically connected to the display, the biometric sensor, the memory, and the communication circuit, wherein the memory stores a plurality of instructions that, when executed, causes the processor to: receive an electronic document from at least one server using the communication circuit; obtain biometric information associated with a user using the biometric sensor; transmit the biometric information associated with the user to the at least one server through the communication circuit; obtain a signature of the user associated with the electronic document using the display; encrypt the obtained signature with specified data associated with the biometric information; and transmit the encrypted signature and at least one of the electronic document and identification information of the electronic document by using the communication circuit.

In accordance with another aspect of the present disclosure, a method of processing an signature, comprises receiving an electronic document from at least one server; obtaining biometric information associated with a user; transmitting the biometric information associated with the user to the at least one server; obtaining a signature of the user associated with the electronic document; encrypting the obtained signature with specified data associated with the biometric information; and transmitting the encrypted signature to the at least one server together with the electronic document or identification information of the electronic document.

In accordance with still another aspect of the present disclosure, an electronic device comprising an input device; a biometric sensor; a communication circuit; a memory; and at least one processor electrically connected to the input device, the memory, the biometric sensor, and the communication circuit, wherein the memory stores a plurality of instructions that, when executed, causes the at least one processor to: obtain biometric information of a user by using the biometric sensor; transmit data associated with the biometric information of the user to at least one server by using the communication circuit; obtain personal identification number (PIN) information by using the input device; encrypt the obtained PIN information of the user with specified data associated with the biometric information; and transmit the encrypted PIN information to the at least one server by using the communication circuit.

According to embodiments of the present disclosure, when the user authentication is performed using an signature or PIN information, the signature or the PIN information is encrypted with the biometric authentication information to form a dependency relationship in which the biometric authentication information is required to be verified when the signature or the PIN information is verified, so that the reliability of the user authentication may be improved.

In addition, various effects that are directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, similar elements may be marked by similar reference numerals.

DETAILED DESCRIPTION

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
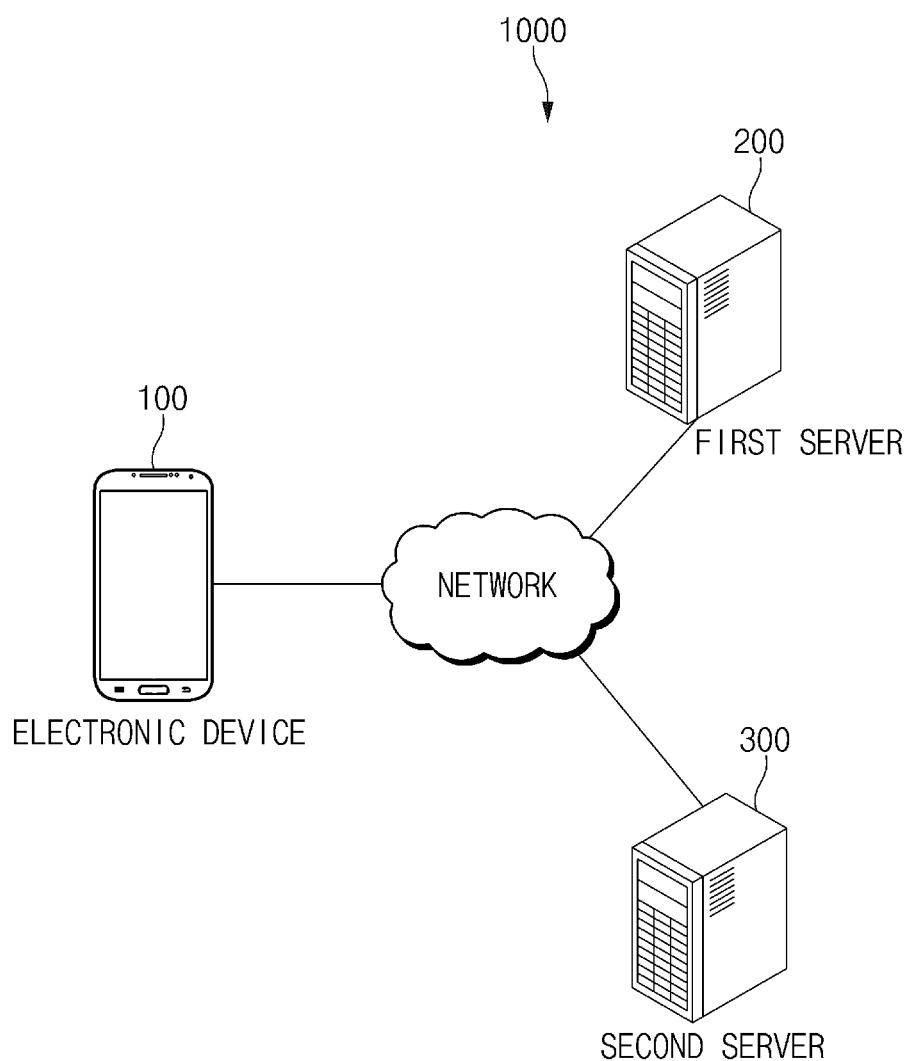
FIG. 1 is a view illustrating a configuration of an authentication system according to various embodiments.

FIG. 1 is a view illustrating a configuration of an authentication system 1000 according to various embodiments.

Referring to FIG. 1, a user authentication system 1000 may include an electronic device 100, and a first external server (or a biometric verification server) 200 and a second external server (or a signature verification server) 300. Components included in the authentication system 1000 may be connected to each other through a network. The first server 200 can be a first server 200, while second server 300 can be a second server 300. For example, the electronic device 100, and the first server and second server 200 and 300 may be connected to each other through a communications network, such as a mobile communication network or Internet network, or combination thereof.

According to an embodiment, the electronic device 100 may verify that a received (or obtained) signature is a signature (or a handwritten signature) of a registered user, by using biometric authentication according to various embodiments. For example, the biometric authentication may be one of, but not limited to, fingerprint authentication, iris authentication, face authentication, and voice authentication.

According to an embodiment, the electronic device 100 may perform user authentication through a signature of a user. For example, the electronic device 100 may perform user authentication by obtaining a handwritten signature of a user and comparing the obtained signature with signature information of a registered user. The signature information, for example, may include user action information (or additional information such as a pressure, a velocity, a degree of tilt of input, or the like) based on a handwritten input as well as information about handwriting habits.

According to an embodiment, the electronic device 100 may perform user authentication by using the biometric authentication together with the user signature. For example, the electronic device 100 may encrypt the user signature by using a key (e.g., a private key and a public key) generated through the biometric authentication, and may decrypt the encrypted signature to perform the user authentication. In other words, the encrypted user signature may be dependent on the key generated by the biometric authentication. Thus, the electronic device 100 may encrypt the signature, by using the biometric authentication, thereby improving the reliability of signature-based user authentication.

According to an embodiment, the electronic device 100 may perform the user authentication through an external server, such as the first server 200 or the second server 300. For example, the electronic device 100 may perform the biometric authentication by using the first server 200. The electronic device 100 may register information for the biometric authentication in the first server 200. The electronic device 100 may transmit the registered authentication information to the first server 200 and compare the authentication information with the registered information to perform biometric authentication. As another example, the electronic device 100 may perform the signature authentication by using the second server 300. The electronic device 100 may register the signature information in the second server 300 and perform the signature authentication by comparing an input signature with the registered information.

According to an embodiment, the electronic device 100 may provide the user authentication service using a user authentication app (or application). For example, the user authentication app may interwork with a biometric authentication program and a signature authentication program to provide the user authentication service. According to an embodiment, the electronic device 100 may provide a user interface (UI) associated with the user authentication through the user authentication app. For example, the electronic device 100 may provide a UI associated with the biometric authentication and signature authentication. According to an embodiment, the electronic device 100 may interwork with an account for user authentication (e.g., Samsung Account®) to provide the user authentication service.

According to an embodiment, the first server 200 may be a server for biometric authentication. According to an embodiment, the first server 200 may receive biometric authentication information from the electronic device 100 and compare the received information with registered user information to perform the user authentication. According to an embodiment, when the received biometric authentication is verified as the biometric authentication information of a registered user, the first server 200 may generate a token (or one-time token) and transmit it to the electronic device 100. For example, the token may include information indicating biometric authentication. The information indicating biometric authentication may include account information of a user and a third party information capable of indicating biometric authentication. In addition, the token may include a specified valid period capable of confirming the biometric authentication. For example, the specified valid period may be a time for which an external device can confirm biometric authentication of the user by using the token.

According to an embodiment, the second server 300 may be a server for providing a service desired by a user. For example, when the second server 300 receives a request for obtaining a specific document (or an electronic document) from the electronic device 100, the second server 300 may transmit the document corresponding to the received request to the electronic device 100. The document, for example, may be a document in which a signature is required to be included.

According to an embodiment, the second server 300 may be a server for signature authentication. According to an embodiment, the second server 300 may receive signature information from the electronic device 100 and compare the received information with the registered signature information to authenticate that the user is a registered user. For example, the signature information may include handwriting information of a user and action information by handwriting input of the user.

According to an embodiment, the providing of the user desired service and the user authentication by the second server 300 may be performed in different servers, respectively. In other words, the user desired service and the user authentication may be provided by a plurality of servers, respectively. In addition, the first and second servers 200 and 300 may be configured in the same server. In other words, the user authentication system 1000 may include at least one server.

Figure 2:
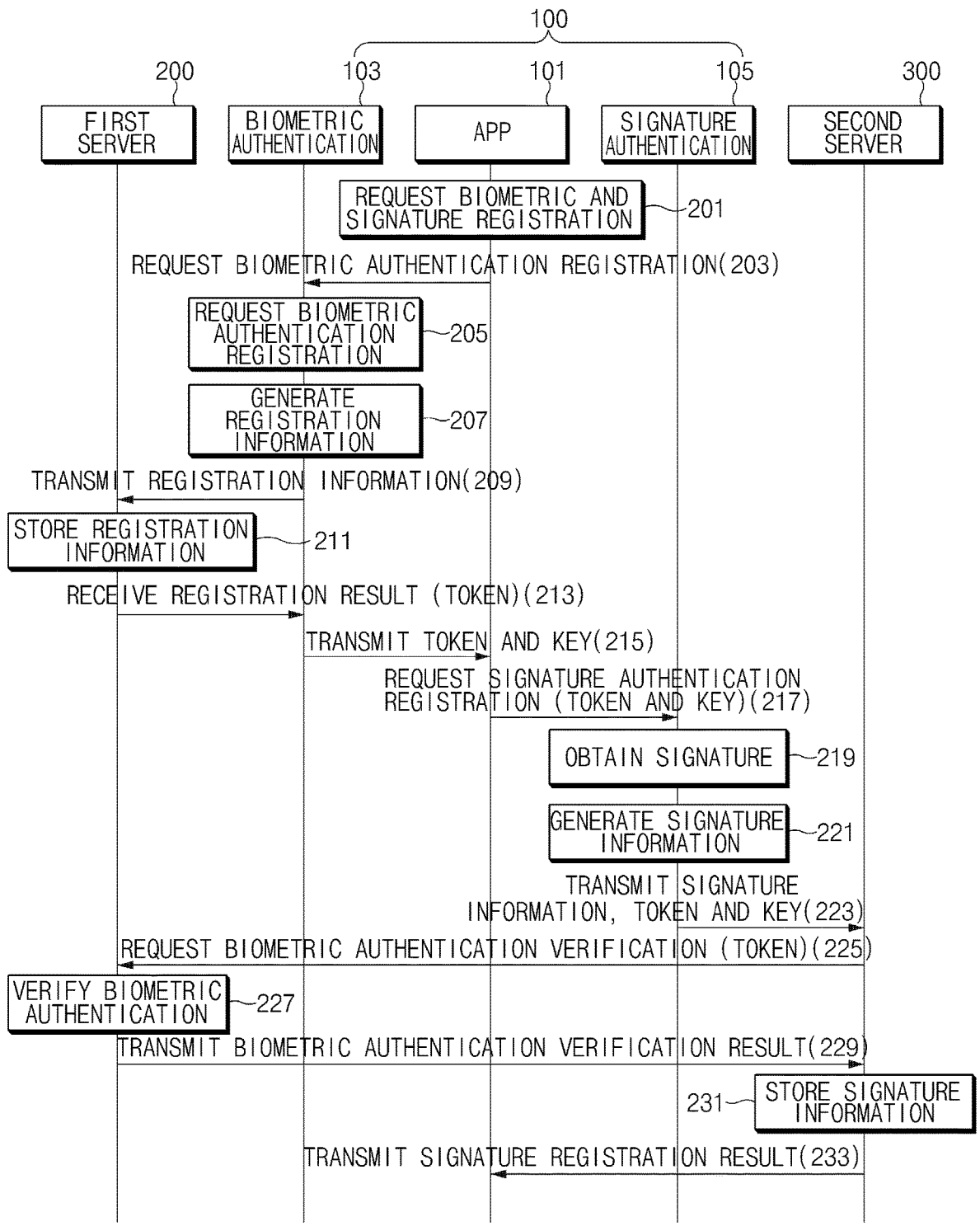
FIG. 2 is a view illustrating a method of registering biometric information and an signature information by an electronic device according to various embodiments.

FIG. 2 is a view illustrating a method of registering biometric information and signature information by an electronic device according to various embodiments.

Referring to FIG. 2, the electronic device 100 may perform registration for biometric authentication and signature authentication. The electronic device 100 may include an app 101 for authenticating a user, a biometric authentication program 103 (or biometric authentication), and an signature authentication program 105 (or signature authentication). The app 101 for authenticating a user may interwork with the biometric authentication program 103 and the signature authentication program 105 to perform registration for biometric authentication and signature authentication.

According to an embodiment, in operation 201, the app 101 may receive a registration request from a user for biometric authentication and signature authentication. A user may input a request for registration of biometric authentication with the first server (or the biometric verification server) 200 and signature authentication with the second server (or signature verification server) 300. According to an embodiment, in operation 203, the app 101 may transmit the request for registration of biometric authentication to the biometric authentication program 103.

According to an embodiment, in operation 205, when the biometric authentication program 103 receives the request for registration of biometric authentication, the biometric authentication program 103 may register the biometric information. For example, the biometric authentication program 103 may recognize biometric information of a user (or biometric information related to the user) and register the recognized biometric information as biometric information used for biometric authentication.

According to an embodiment, in operation 207, the biometric authentication program 103 may generate registration information. For example, the registration information may include a private key and a public key. The private and public keys may be a pair of asymmetric keys. In other words, the public key may correspond to the private key. In general, the public key encryption is generally difficult to invert from information from the public key. The private key decrypts data encrypted by the public key. According to an embodiment, the registration information generated from the biometric authentication program 103 may be set to be linked to the biometric information generated in operation 205. For example, the registration information may be set to be accessible when the biometric authentication using the biometric information is completed.

According to an embodiment, in operation 209, the biometric authentication program 103 may transmit the registration information to the first server 200. For example, the biometric authentication program 103 may transmit the public key in the generated registration information to the first server 200.

According to an embodiment, in operation 211, the first server 200 may store the registration information, that may include the public key. In other words, the first server 200 may register the public key included in the registration information. When the registration information is successfully stored, the first server 200 may generate the token (or one-time token). According to an embodiment, in operation 213, the first server 200 may transmit the token as a result of storing the registration information to the electronic device 100.

According to an embodiment, in operation 215, the biometric authentication program 103 may receive the result of storing the registration information and may transmit the token and the registration information to the app 101. For example, the biometric authentication program 103 may transmit the private and public keys included in the registration information to the app 101.

According to an embodiment, in operation 217, when the token and registration information are received, the app 101 may transmit a request of registering signature authentication to the signature authentication program 105. For example, the request of registering signature authentication may include the token information and the registration information generated during 207.

According to an embodiment, in operation 219, when the request of registering signature authentication is received, the signature authentication program 105 may obtain a signature from a user. In addition, the signature authentication program 105 may obtain additional information (e.g., a pressure, a velocity, a degree of tilt of input, or the like) of a handwritten input through a sensor.

According to an embodiment, in operation 221, the signature authentication program 105 may generate signature information. For example, the signature information may include image information of the obtained signature and the additional information of the handwritten input. According to an embodiment, the signature authentication program 105 may register the generated signature information.

According to an embodiment, in operation 223, the signature authentication program 105 may transmit the signature information, the token information (received by the app 100 during 215) and the registration information to the second server 300.

According to an embodiment, in operation 225, the second server 300 may transmit a request of verifying biometric authentication to the first server 200. For example, the request of verifying biometric authentication may include the token information. According to an embodiment, in operation 227, the first server 200 may verify the biometric authentication. The first server 200 may verify the biometric authentication result by verifying the token information received from the second server 300. For example, the first server 200 may verify that the received token is the same as the token generated to authenticate the registered user (during 213).

According to an embodiment, in operation 229, the first server 200 may transmit a result of verifying biometric authentication to the second server 300. For example, when the token received during 223 is the same as the token generated to authenticate the registered user at 207, the first server 200 may transmit the result of verifying biometric authentication.

According to an embodiment, in operation 231, the second server 300 may store the signature information. In addition, the second server 300 may store the public key included in the registration information received from the electronic device 100. For example, when the result of verifying biometric authentication is received, the second server 300 may store the signature information and the public key. In addition, according to an embodiment, in operation 233, the second server 300 may transmit a result of registering a signature to the electronic device 100.

Therefore, when the biometric authentication registration and the signature authentication registration in each of the first server and second servers 200 and 300 are completed, the electronic device 100 may encrypt the signature through the biometric authentication to perform the user authentication.

Figure 3:
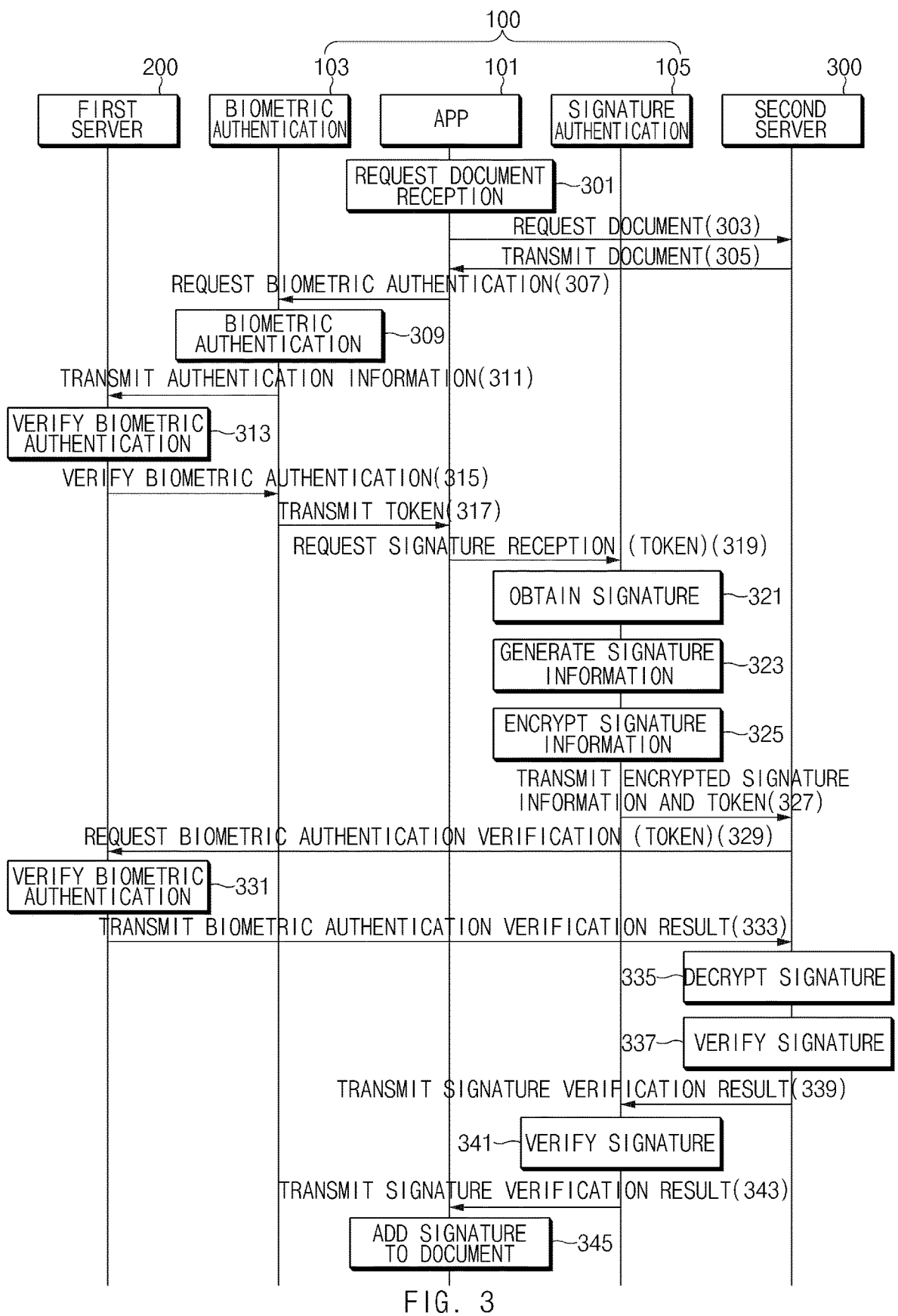
FIG. 3 is a view illustrating a method of authenticating a user through biometric authentication and signature authentication by an electronic device according to an embodiment.

FIG. 3 is a view illustrating a method of authenticating a user through biometric authentication and signature authentication by an electronic device according to an embodiment Referring to FIG. 3, the electronic device 100 may perform the user authentication by encrypting the signature information through the biometric authentication. In addition, the electronic device 100 may include the signature used for performing the user authentication in the received electronic document as at least a portion of the received electronic document.

According to an embodiment, in operation 301, the app 101 may receive a request for a document from a user. The user may input the request for receiving a document through the app 101. The document, for example, may be a document in which a signature is required to be included.

According to an embodiment, in operation 303, the app 101 may transmit the request for receiving a document to the second server 300. According to an embodiment, in operation 305, the second server 300 may transmit the document corresponding and in response to the request. According to an embodiment, in operation 307, the app 101 can confirm that the received document is a document in which a signature is to be included and may transmit a request for biometric authentication to the biometric authentication program 103, responsive to receiving the document.

According to an embodiment, in operation 309, when the request for biometric authentication is received, the biometric authentication program 103 may perform the biometric authentication. For example, the biometric authentication program 103 may obtain the biometric information of the user (or the biometric information related to the user) through a biometric sensor and compare the biometric information with the registered biometric information to perform the biometric authentication.

According to an embodiment, in operation 311, when the biometric information of a registered user is verified through the obtained biometric authentication, the biometric authentication program 103 may transmit biometric authentication information to the first server (or the biometric verification server) 200. For example, the biometric authentication information may include data associated with the biometric information. Before performing the biometric authentication, the biometric authentication program 103 may receive an authentication verification value having a random value (pseudo-random, or an arbitrary value) from the first server 200, and may encrypt the authentication verification value with the private key to generate the data associated with the biometric information.

According to an embodiment, in operation 313, the first server (or signature verification server) 200 may receive the biometric authentication information and verify the biometric authentication by using the received biometric information. For example, the first server 200 may decrypt the authentication verification value included in the biometric authentication information by using the public key and may compare the decrypted authentication verification value with an authentication verification value stored in the first server 200 to verify the biometric authentication. According to an embodiment, when the first server 200 verifies the biometric authentication, the first server 200 may generate the token. According to an embodiment, in operation 315, the first server 200 may transmit the authentication verification result to the electronic device 100. For example, the authentication verification result may include the generated token. The electronic device 100 may receive the authentication verification result in response to (or based on) the transmission operation in operation 311.

According to an embodiment, in operation 317, the biometric authentication program 103 may transmit the token included in the authentication verification result to the app 101. According to an embodiment, in operation 319, the app 101 may transmit a signature reception request to the signature authentication program 105. For example, when the token satisfies a predetermined condition, the app 101 may transmit the signature reception request to the signature authentication program 105. When the predetermined condition, for example, the third party information included in the token is the same as the party transmitting (or releasing) a document, the signature reception request may be transmitted to the signature authentication program 105. The signature reception request may include token information.

According to an embodiment, in operation 321, the signature authentication program 105 may obtain a signature. For example, when the token included in the signature reception request is received, the signature authentication program 105 may obtain the signature of the user. In addition, the signature authentication program 105 may additionally obtain additional information (e.g., a pressure, a velocity, a degree of tilt of input, or the like) of a handwritten input through a sensor. According to an embodiment, the signature authentication program 105 may obtain a handwritten signature of the user by using a touch screen display.

According to an embodiment, in operation 323, the signature authentication program 105 may generate signature information. For example, the signature information may include image information of the obtained signature and the additional information of the handwritten input.

According to an embodiment, in operation 325, the signature authentication program 105 may encrypt the generated signature information. For example, the signature authentication program 105 may encrypt the signature information using the private key. In other words, the signature authentication program 105 may encrypt the obtained signature and the additional information of the handwritten input with the private key.

According to an embodiment, in operation 327, the signature authentication program 105 may transmit the encrypted signature information and the token (received during 317) to the second server 300. In addition, the signature authentication program 105 may transmit the document (or identification information of the document) received in operation 305 to the second server 300 together with the encrypted signature information.

According to an embodiment, in operation 329, the second server 300 may transmit a request of verifying biometric authentication to the first server 200. For example, the request of verifying biometric authentication may include the token information. According to an embodiment, in operation 331, the first server 200 may verify the biometric authentication. The first server 200 may verify the biometric authentication result by verifying the token information received from the second server 300. For example, the first server 200 may verify that the received token is the same as the token generated to authenticate the registered user.

According to an embodiment, in operation 333, the first server 200 may transmit the result of verifying biometric authentication to the second server 300. For example, when the received token is the same as the token generated to authenticate the registered user, the first server 200 may transmit the result of verifying biometric authentication.

According to an embodiment, in operation 335, the second server 300 may decrypt the encrypted signature information by using the public key. For example, the second server 300 may decrypt the signature information when the result of verifying biometric authentication is received. According to an embodiment, in operation 335, the second server 300 may compare the decrypted signature information with the registered signature information. For example, the second server 300 may compare the decrypted signature and the additional information of the handwritten input with the signature and additional information of the registered user. According to an embodiment, when the decrypted signature information is the same as the signature information of the registered user, in operation 339, the second server 300 may transmit the signature verification result to the electronic device 100. According to an embodiment, when the decrypted signature information is different from the signature information of the registered user, the second server 300 may not transmit the signature verification result to the electronic device 100.

According to an embodiment, in operation 341, when the signature authentication program 105 receives the signature verification result, the signature authentication program 105 may compare the signature information of the user with the registered signature information for verification. In other words, the signature authentication program 105 may verify the signature input once again. According to an embodiment, when the signature verification result is not received, the signature authentication program 105 may delete the information about the signature obtained in operation 321.

According to an embodiment, in operation 343, the signature authentication program 105 may transmit the signature verification result to the app 101.

According to an embodiment, in operation 345, when the signature verification result is received, the app 101 may include the signature in the document received in operation 305 as at least a portion of the received document. According to an embodiment, the app 101 may transmit the document including the signature to the second server 300.

According another embodiment, the biometric authentication operation (operation 309) of the biometric authentication program 103 of the electronic device 100 and the signature obtaining operation (operation 321) of the signature authentication program 105 of the electronic device 100 may be executed at the same time. In other words, the electronic device 100 may perform the operation of obtaining a user signature without regard to whether the first server 200 receives the result of verifying biometric authentication or not.

Therefore, when including the signature for proving that the document received from the second server 300 is verified, the electronic device 100 may encrypt the signature to be included as at least a portion of the document by using the information obtained through the biometric authentication and perform the user authentication, thereby improving the reliability of the signature included in the document.

Figure 4:
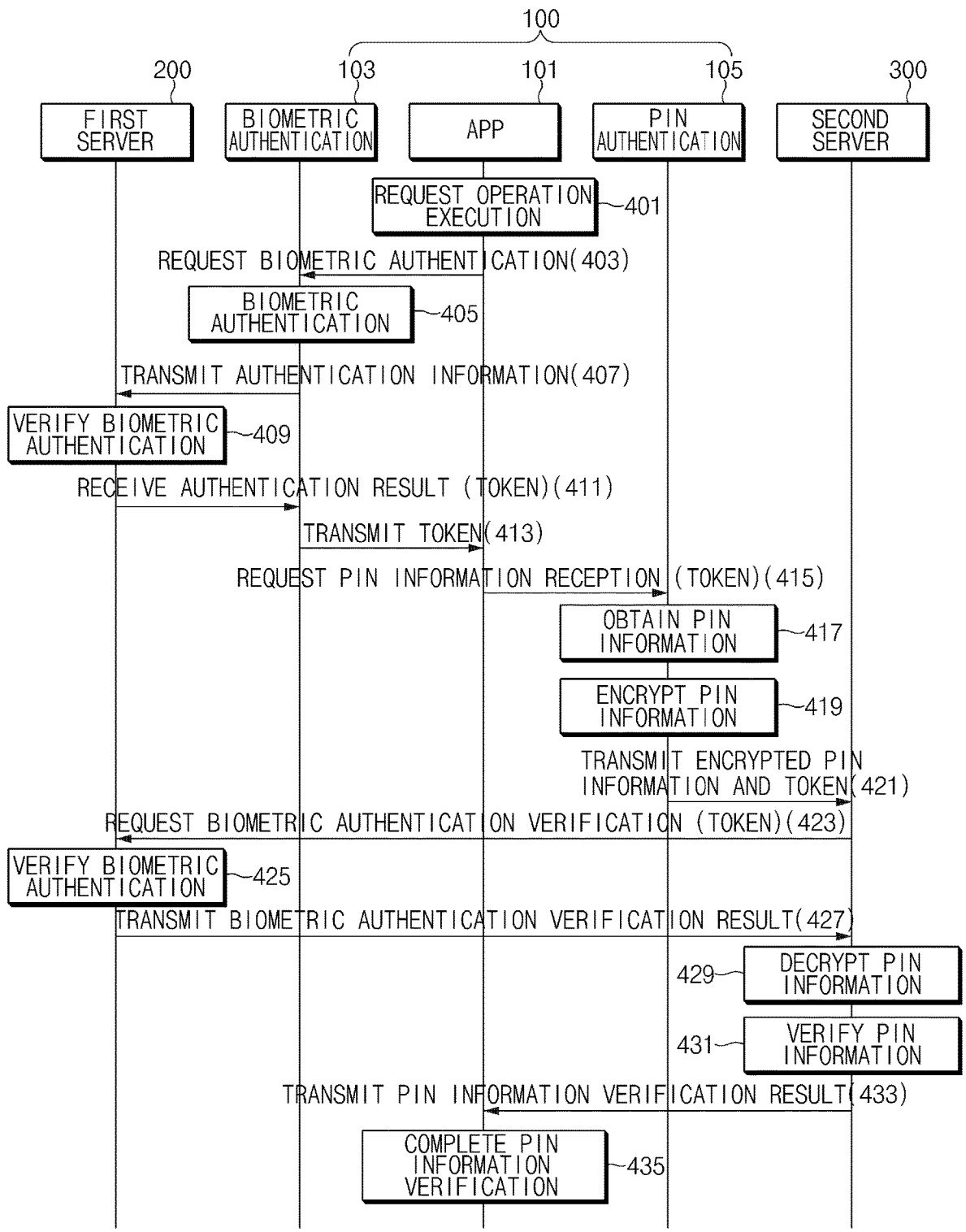
FIG. 4 is a view illustrating a method of authenticating a user through biometric authentication and personal identification number (PIN) information by an electronic device according to an embodiment.

FIG. 4 is a view illustrating a method of authenticating a user through biometric authentication and personal identification number (PIN) information by an electronic device according to an embodiment.

Referring to FIG. 4, the electronic device 100 may encrypt PIN information through biometric authentication to perform user authentication. In addition, the electronic device 100 may perform an operation required to authenticate the PIN information on which the user authentication is performed.

According to an embodiment, the electronic device 100 may perform the user authentication through the biometric authentication and the PIN information authentication instead of signature authentication. Like the biometric authentication and signature authentication registration of FIG. 2, the electronic device 100 may register the biometric authentication and the PIN information in the first server (or the biometric verification server) 200 and the second server (or the PIN verification server) 300. According to an embodiment, the electronic device 100 may further include a PIN authentication program 105'.

According to an embodiment, in operation 401, the app 101 may receive a request for operation execution from a user. The user may input a request for performing a predetermined operation through the app 101. For example, the predetermined operation may be an operation requiring the PIN information authentication.

According to an embodiment, operations 403 to 413 may be similar to operations 307 to 317 of FIG. 3. The electronic device 100 may perform the biometric authentication through operations 403 to 413 and may receive a token.

According to an embodiment, in operation 415, the app 101 may transmit a PIN information reception request to the PIN authentication program 105'. For example, when the token satisfies a predetermined condition, the app 101 may transmit the signature reception request to the signature authentication program 105. The PIN information reception request may include token information.

According to an embodiment, in operation 417, the PIN authentication program 105' may obtain the PIN information. For example, when the PIN authentication program 105' receives the token included in the PIN information reception request, the PIN authentication program 105' may obtain the PIN information of the user. According to an embodiment, the PIN authentication program 105' may obtain the PIN information through an input device. For example, the PIN authentication program 105' may obtain the PIN information through a hardware key (e.g., a physical key) or a software key (e.g., an icon displayed on a touch screen display).

According to an embodiment, in operation 419, the PIN authentication program 105' may encrypt the obtained PIN information. For example, the PIN authentication program 105' may encrypt the obtained PIN information with the private key.

According to an embodiment, in operation 421, the PIN authentication program 105' may transmit the encrypted PIN information and the token to the second server 300.

According to an embodiment, operations 423 to 427 may be similar to operations 329 to 333 of FIG. 3. The second server 300 may verify the biometric authentication through operations 423 to 427.

According to an embodiment, in operation 429, the second server 300 may decrypt the encrypted PIN information with the public key. For example, when the result of verifying biometric authentication is received, the second server 300 may decrypt the encrypted PIN information. According to an embodiment, in operation 431, the second server 300 may compare the decrypted PIN information with the registered PIN information. According to an embodiment, in operation 433, when the decrypted PIN information is the same as the PIN information of the registered user, the second server 300 may transmit the PIN information verification result to the electronic device 100. According to an embodiment, when the decrypted PIN information is different from the PIN information of the registered user, the second server 300 may not transmit the PIN information verification result to the electronic device 100.

According to an embodiment, in operation 435, when the PIN information verification result is received, the app 101 may perform an operation required for the PIN information authentication. According to an embodiment, when the PIN information verification result is not received, the app 101 may delete the information about the signature obtained in operation 417. According to another embodiment, the PIN authentication program 105' may receive the PIN information verification result and compare the PIN information of the user with the registered PIN information, thereby verifying the PIN information. In other words, the PIN authentication program 105' may verify the PIN information input once again.

According to an embodiment, like operations 303 and 305 of FIG. 3, the electronic device 100 may receive a document. For example, the document may be a document of which contents can be recognized only when the PIN information authentication is performed. In other words, the operation requiring the PIN information authentication may be an operation of displaying the received document on a display.

According to another embodiment, the biometric authentication operation (operation 405) of the biometric authentication program 103 of the electronic device 100 and the PIN information obtaining operation (operation 417) of the signature authentication program 105 may be executed at the same time. In other words, the electronic device 100 may perform the operation of obtaining the PIN information without regard to whether the first server 200 receives the result of verifying biometric authentication or not.

Thus, the electronic device 100 may perform the user authentication by encrypting the PIN information with the information obtained through the biometric authentication, thereby improving the reliability of PIN information authentication.

Figure 5:
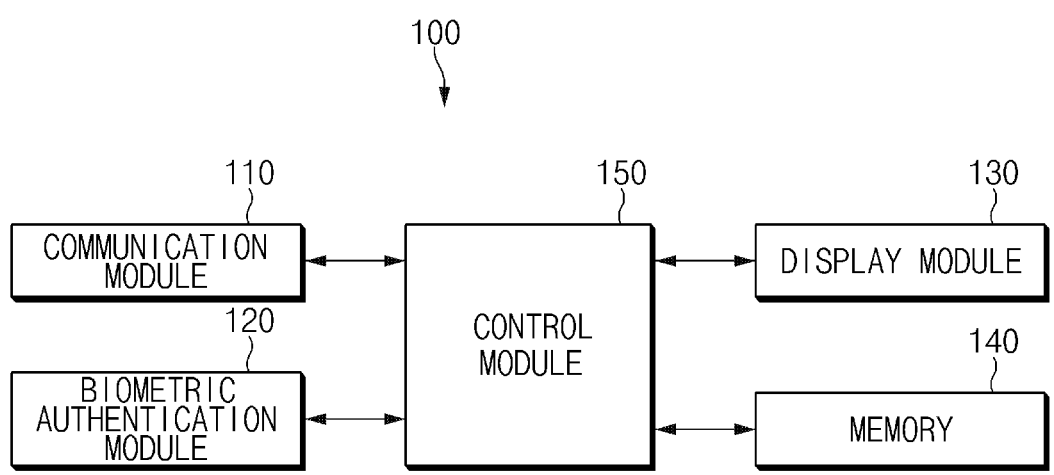
FIG. 5 is a view illustrating a configuration of an electronic device according to various embodiments.

FIG. 5 is a view illustrating a configuration of an electronic device according to various embodiments.

Referring to FIG. 5, the electronic device 100 may include a communication module (or a communication circuit) 110, a biometric authentication module (or a biometric sensor) 120, a display module 130, a memory 140, and a control module (or a processor) 150.

According to an embodiment, the communication module 110 may communicate with an external device. According to an embodiment, the communication module 110 may transmit/receive information about payment to/from an external device (e.g., the first server (or the 200, the second server 300, and the like). According to an embodiment, the communication module 110 may transmit/receive data through a network (e.g., a mobile communication network or Internet). According to an embodiment, the communication module 110 may include a cellular module, a wireless-fidelity (Wi-Fi) module, a Bluetooth module, a near field communication (NFC) module, a magnetic secure transmission (MST) module, a global navigation satellite system (GNSS) module, and the like.

According to an embodiment, the biometric authentication module 120 may recognize biometric information of a user (or biometric information related to a user, e.g., a fingerprint, an iris, a face, a voice, and the like) and perform user authentication by using the biometric information. According to an embodiment, the biometric authentication module 120 may include at least one of a fingerprint authentication module, an iris authentication module, a face authentication module, and a voice (or sound) authentication module.

According to an embodiment, the display module 130 may display an image. For example, the display module 130 may display a document requested by a user.

According to an embodiment, the display module 130 may include a touch screen display. The touch screen display may not only display an image but also receive a user input through a touch input. For example, the electronic device 100 may receive (or obtain) the user signature by using the touch screen display. As another example, the electronic device 100 may display an indicator (e.g., a virtual keyboard or a virtual digit pad) on the touch screen display and may receive a user input (e.g., a PIN information input) through the indicator. As still another embodiment, the electronic device 100 may include a separated input device. For example, the input device may include a hardware key (e.g., a physical button).

According to an embodiment, the memory 140 may store information related to a payment service. According to an embodiment, the memory may include an embedded secure element (eSE), an embedded subscriber identity module (eSIM), or a trusted execution environment (TEE).

According to an embodiment, the memory 140 may store information about a payment service account (e.g., Samsung Account), a biometric authentication service account, and a third party service account. In addition, the memory 140 may store key information and token information that are generated during an authentication process as well as biometric information, signature information and PIN information required for user authentication. The biometric information, key information and token information for the biometric authentication may be stored in the TEE.

According to an embodiment, the control module 150 may control the overall operation of the electronic device 100. The control module 150 may control the communication module 110, the biometric authentication module 120, the display module 130, and the memory 140, respectively, to perform the user authentication according to various embodiments. According to an embodiment, the control module 150 may execute an operation for performing a task by executing instructions stored in the memory 140.

According to an embodiment, the control module 150 (e.g., an application processor) may be implemented as a system-on-chip (SoC) including a processor (or a central processing unit (CPU)), a graphic processing unit (GPU), a video processor, a memory, and the like.

According to an embodiment, the control module 150 may perform the user authentication through the biometric authentication and a user signature as described in FIG. 3.

According to an embodiment, the control module 150 may receive an electronic document from at least one server (e.g., the second server 300) through the communication module 110.

According to an embodiment, the control module 150 may obtain the biometric information of the user through the biometric authentication module 120 and may transmit data associated with the biometric information of the user through the communication module 110 to the at least one server (e.g., the first server 200). According to an embodiment, the control module 150 may receive a one-time token from the at least one server through the communication module 110 in response to the transmission. According to an embodiment, the control module 150 may obtain the signature of the user associated with the electronic document through the display (or a display including a touch screen) 130 and may encrypt the obtained user signature with a private key corresponding to the biometric information. According to an embodiment, the control module 150 may transmit the encrypted signature to the at least one server (e.g., the second server 300) through the communication module 110 together with at least one of the electronic document and identification information of the electronic document.

According to an embodiment, the control module 150 may receive, through the communication module 110, information associated with the result of verifying that the encrypted signature corresponds to the signature of the user. According to an embodiment, the control module 150 may include the signature in the electronic document as at least a portion of the electronic document, based on the received result information.

According to another embodiment, the control module 150 may perform the user authentication through the biometric authentication and the PIN information of a user, which is described in FIG. 4.

According to another embodiment, the control module 150 obtain the biometric information of the user through the biometric authentication module 120 and may transmit data associated with the biometric information of the user through the communication module 110 to the at least one server (e.g., the first server 200). According to an embodiment, the control module 150 may receive the one-time token from the at least one server (e.g., the first server 200) through the communication module 110 in response to the transmission. According to an embodiment, the control module 150 may obtain the PIN information of the user through an input device and may encrypt the obtained user PIN information with the private key corresponding to the biometric information. According to an embodiment, the control module 150 may transmit the encrypted PIN information to the at least one server (e.g., the second server 300) through the communication module 110.

According to an embodiment, the control module 150 may receive, through the communication module 110, information about the result of verifying that the encrypted PIN information corresponds to the PIN information input by the user. According to an embodiment, the control module 150 may perform an operation required for the authentication of the PIN information based on the received result information.

Figure 6:
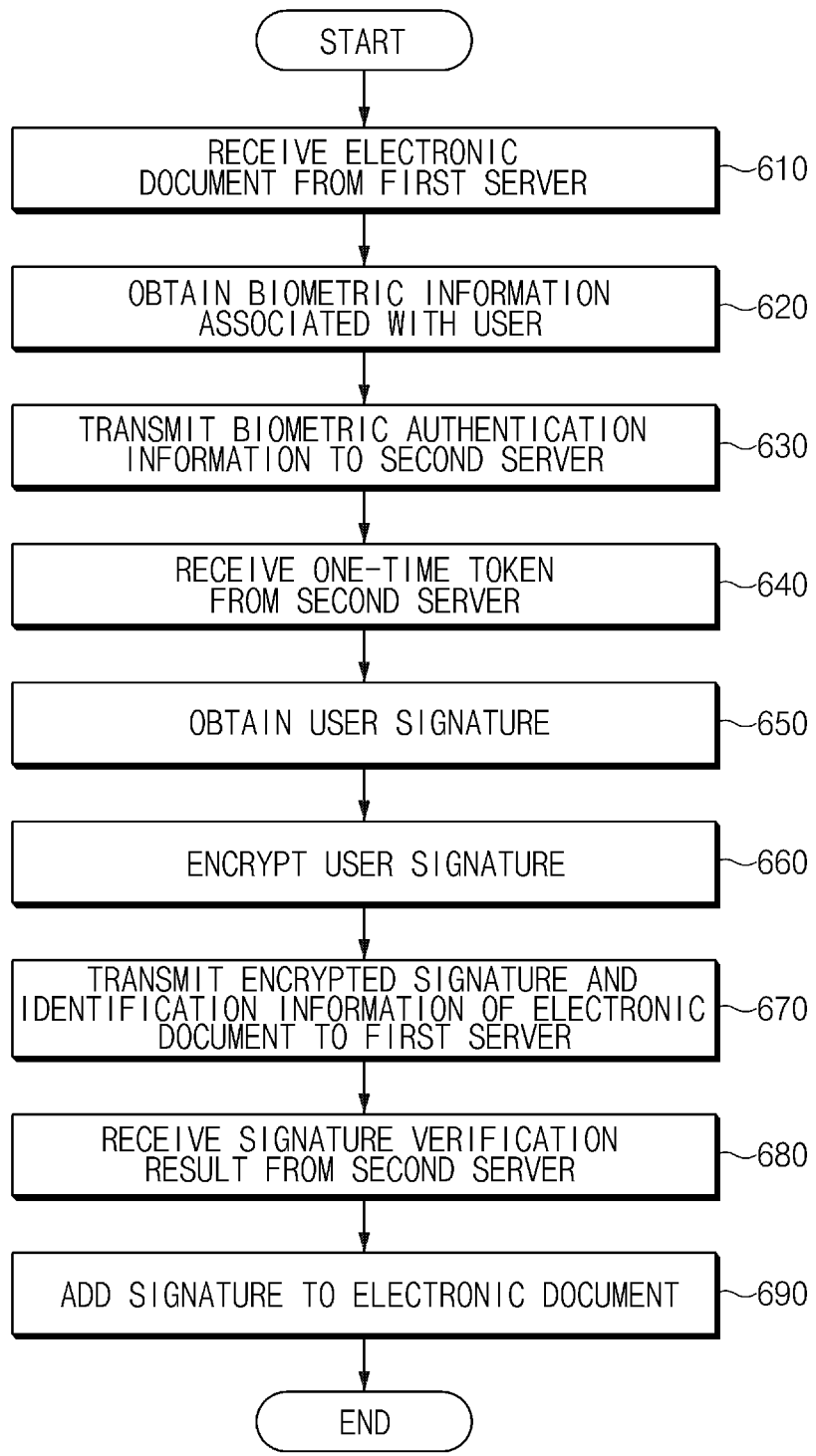
FIG. 6 is a flowchart illustrating a method of authenticating a user through biometric authentication and signature authentication by an electronic device according to an embodiment.

FIG. 6 is a flowchart illustrating a method of authenticating a user through the biometric authentication and the signature authentication of an electronic device according to an embodiment.

According to an embodiment, in operation 610, the electronic device (e.g., the control module 150) 100 may receive an electronic document from a first server (e.g., the second server (or the signature verification server) 300 of FIG. 1).

According to an embodiment, in operation 620, the electronic device 100 may obtain the biometric information (or the biometric information associated with the user) of the user through the biometric authentication module 120. The electronic device 100 may compare the obtained biometric information with registered biometric information to perform the biometric authentication.

According to an embodiment, in operation 630, the electronic device 100 may transmit data associated with the biometric information of the user to a second server (e.g., the first server (or the biometric verification server) 200 of FIG. 1). For example, when it is verified that the biometric information obtained in operation 620 corresponds to the biometric information of the registered user, the electronic device 100 may transmit biometric authentication information to the first server 200.

According to an embodiment, in operation 640, the electronic device 100 may receive a one-time token from the second server in response to (or based on) the transmission.

According to an embodiment, in operation 650, the electronic device 100 may obtain the user signature associated with the electronic document through the display (or the display including a touch screen) 130.

According to an embodiment, in operation 660, the electronic device 100 may encrypt the obtained user signature with the specified data associated with the biometric information. The specified data may include the private key.

According to an embodiment, in operation 670, the electronic device 100 may transmit the encrypted signature to the first server 200 together with at least one of the electronic document and identification information of the electronic document.

According to an embodiment, in operation 680, the electronic device 100 may receive the information associated with the result of verifying that the encrypted signature corresponds to the user signature.

According to an embodiment, in operation 690, the electronic device 100 may include the signature in the electronic document as at least a portion of the electronic document, based on the result information received from the second server.

Figure 7:
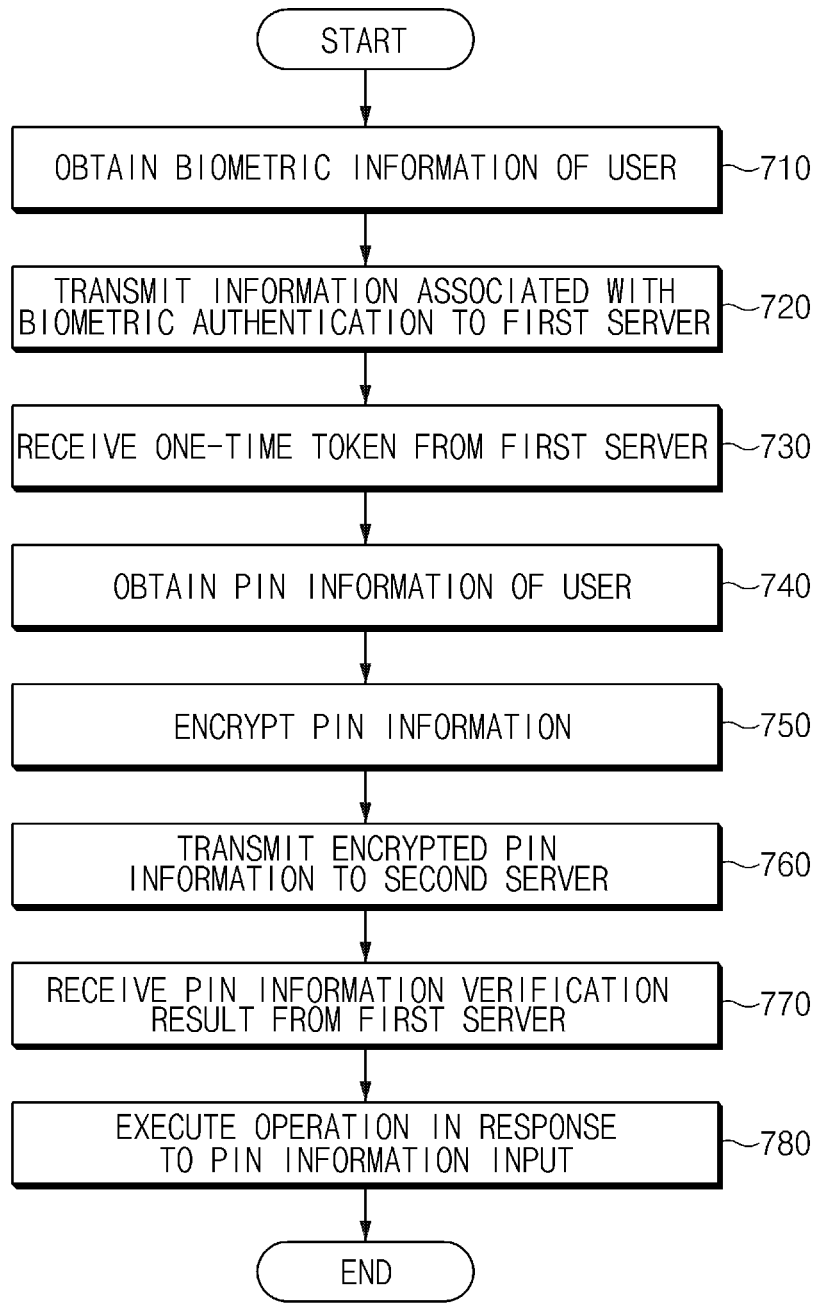
FIG. 7 is a flowchart illustrating a method of authenticating a user through biometric authentication and PIN information by an electronic device according to an embodiment.

FIG. 7 is a flowchart illustrating a method of authenticating a user through the biometric authentication and the PIN information of an electronic device according to an embodiment.

According to an embodiment, in operation 710, the electronic device (e.g., the control module 150) 100 may obtain the biometric information (or the biometric information associated with the user) of the user through the biometric authentication module 120. The electronic device 100 may compare the obtained biometric information with registered biometric information to perform the biometric authentication.

According to an embodiment, in operation 720, the electronic device 100 may transmit data associated with the biometric information of the user to a first server (e.g., the first server (or biometric verification server) 200 of FIG. 1). For example, when it is verified that the biometric information obtained in operation 710 corresponds to the biometric information of the registered user, the electronic device 100 may transmit biometric authentication information to the first server 200.

According to an embodiment, in operation 730, the electronic device 100 may receive a one-time token from the first server (e.g., the first server 200 of FIG. 1) in response to (or based on) the transmission.

According to an embodiment, in operation 740, the electronic device 100 may obtain the PIN information of the user through an input device.

According to an embodiment, in operation 750, the electronic device 100 may encrypt the obtained user PIN information with the specified data associated with the biometric information. The specified data may include the private key.

According to an embodiment, in operation 760, the electronic device 100 may transmit the encrypted PIN information to the second server (e.g., the second server (or the signature verification server) 300 of FIG. 1).

According to an embodiment, in operation 770, the electronic device 100 may receive the information about the result of verifying that the encrypted PIN information corresponds to PIN information input by the user.

According to an embodiment, in operation 780, the electronic device 100 may perform an operation required for the authentication of the PIN information based on the received result information.

Figure 8:
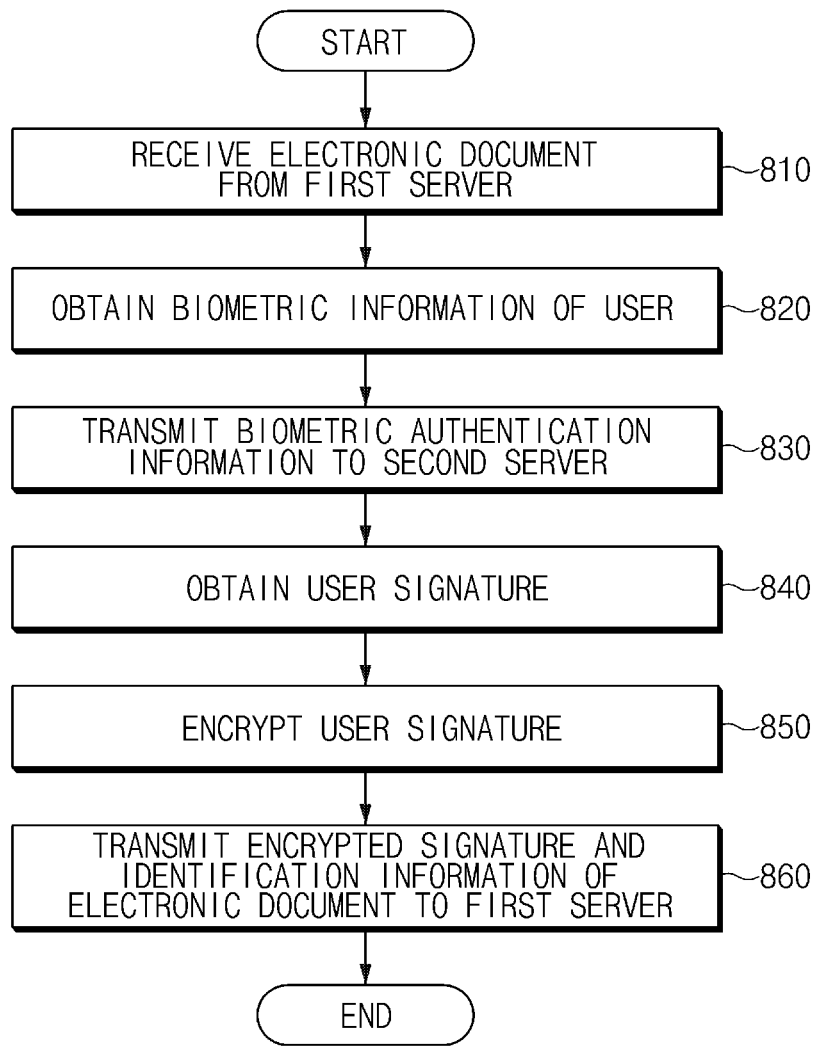
FIG. 8 is a flowchart illustrating a method of authenticating a user through biometric authentication and signature authentication by an electronic device according to an embodiment.

FIG. 8 is a flowchart illustrating a method of authenticating a user through the biometric authentication and the signature authentication of an electronic device according to an embodiment.

According to an embodiment, in operation 810, the electronic device (e.g., the control module 150) 100 may receive an electronic document from a first server (e.g., the second server (or the signature verification server) 300 of FIG. 1).

According to an embodiment, in operation 820, the electronic device 100 may obtain the biometric information (or the biometric information associated with the user) of the user through the biometric authentication module 120. The electronic device 100 may compare the obtained biometric information with registered biometric information to perform the biometric authentication.

According to an embodiment, in operation 830, the electronic device 100 may transmit data associated with the biometric information of the user to a second server (e.g., the first server (or the biometric verification server) 200 of FIG. 1). For example, when it is verified that the biometric information obtained in operation 820 corresponds to the biometric information of the registered user, the electronic device 100 may transmit biometric authentication information to the first server 200.

According to an embodiment, in operation 840, the electronic device 100 may obtain the user signature associated with the electronic document through the display (or the display including a touch screen) 130.

According to an embodiment, in operation 850, the electronic device 100 may encrypt the obtained user signature with the specified data associated with the biometric information. The specified data may include the private key.

According to an embodiment, in operation 860, the electronic device 100 may transmit the encrypted signature to the first server 200 together with at least one of the electronic document and identification information of the electronic document.

Figure 9:
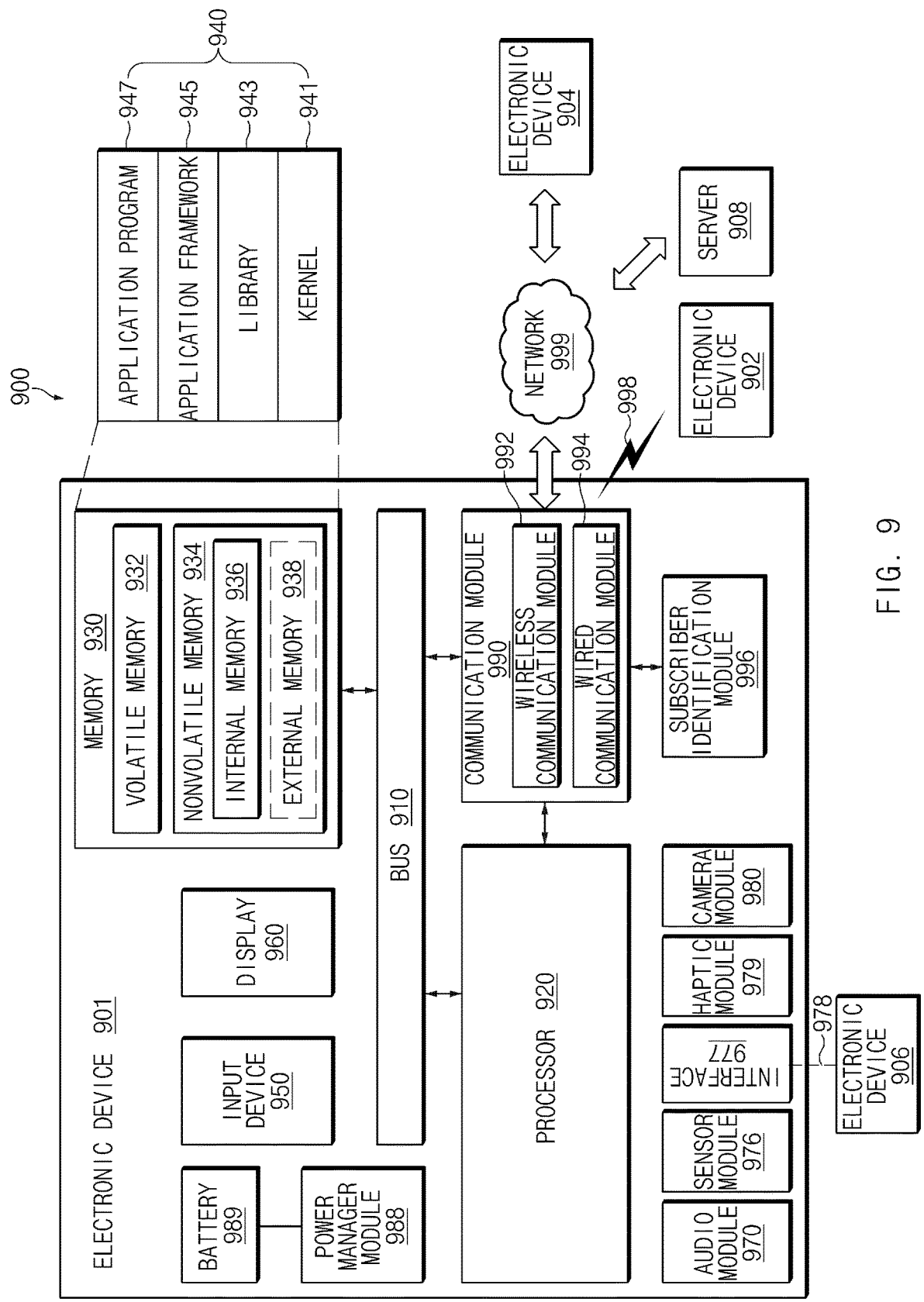
FIG. 9 a block diagram illustrating an electronic device including an signature in an electronic document in a network environment according to various embodiments.

FIG. 9 illustrates a block diagram of an electronic device 901 utilizing an electronic document using a signature (e.g., including an signature in the electronic document) in a network environment 900, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which have measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 9, under the network environment 900, the electronic device 901 (e.g., the electronic device 100 of FIG. 5) may communicate with an electronic device 902 through local wireless communication 998 or may communication with an electronic device 904 or a server 908 through a network 999. According to an embodiment, the electronic device 901 may communicate with the electronic device 904 through the server 908.

According to an embodiment, the electronic device 901 may include a bus 910, a processor 920 (e.g., the control module 150 of FIG. 5), a memory 930, an input device 950 (e.g., a micro-phone or a mouse), a display device 960, an audio module 970, a sensor module 976, an interface 977, a haptic module 979, a camera module 980, a power management module 988, a battery 989, a communication module 990, and a subscriber identification module 996. According to an embodiment, the electronic device 901 may not include at least one (e.g., the display device 960 or the camera module 980) of the above-described components or may further include other component(s).

The bus 910 may interconnect the above-described components 920 to 990 and may include a circuit for conveying signals (e.g., a control message or data) between the above-described components.

The processor 920 may include one or more of a central processing unit (CPU), an application processor (AP), a graphic processing unit (GPU), an image signal processor (ISP) of a camera or a communication processor (CP). According to an embodiment, the processor 920 may be implemented with a system on chip (SoC) or a system in package (SiP). For example, the processor 920 may drive an operating system (OS) or an application program to control at least one of another component (e.g., hardware or software component) of the electronic device 901 connected to the processor 920 and may process and compute various data. The processor 920 may load a command or data, which is received from at least one of other components (e.g., the communication module 990), into a volatile memory 932 to process the command or data and may store the result data into a nonvolatile memory 934.

The memory 930 may include, for example, the volatile memory 932 or the nonvolatile memory 934. The volatile memory 932 may include, for example, a random access memory (RAM) (e.g., a dynamic RAM (DRAM), a static RAM (SRAM), or a synchronous DRAM (SDRAM)). The nonvolatile memory 934 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 934 may be configured in the form of an internal memory 936 or the form of an external memory 938 which is available through connection only if necessary, according to the connection with the electronic device 901. The external memory 938 may further include a flash drive such as compact flash (CF), secure digital (SD), micro secure digital (Micro-SD), mini secure digital (Mini-SD), extreme digital (xD), a multimedia card (MMC), or a memory stick. The external memory 938 may be operatively or physically connected with the electronic device 901 in a wired manner (e.g., a cable or a universal serial bus (USB)) or a wireless (e.g., Bluetooth) manner.

For example, the memory 930 may store, for example, at least one different software component, such as a command or data associated with the program 940, of the electronic device 901. The program 940 may include, for example, a kernel 941, a library 943, an application framework 945 or an application program (interchangeably, "application") 947.

The input device 950 may include a microphone, a mouse, or a keyboard. According to an embodiment, the keyboard may include a keyboard physically connected or a virtual keyboard displayed through the display device 960.

The display device 960 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 901.

In certain embodiments, the display 960 can include a touch screen and obtain a signature from a user.

The audio module 970 may convert, for example, from a sound into an electrical signal or from an electrical signal into the sound. According to an embodiment, the audio module 970 may acquire sound through the input device 950 (e.g., a microphone) or may output sound through an output device (not illustrated) (e.g., a speaker or a receiver) included in the electronic device 901, an external electronic device (e.g., the electronic device 902 (e.g., a wireless speaker or a wireless headphone)) or an electronic device 906 (e.g., a wired speaker or a wired headphone) connected with the electronic device 901

The sensor module 976 may measure or detect, for example, an internal operating state (e.g., power or temperature) of the electronic device 901 or an external environment state (e.g., an altitude, a humidity, or brightness) to generate an electrical signal or a data value corresponding to the information of the measured state or the detected state. The sensor module 976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 976 may further include a control circuit for controlling at least one or more sensors included therein. According to an embodiment, the electronic device 901 may control the sensor module 976 by using the processor 920 or a processor (e.g., a sensor hub) separate from the processor 920. In the case that the separate processor (e.g., a sensor hub) is used, while the processor 920 is in a sleep state, the separate processor may operate without awakening the processor 920 to control at least a portion of the operation or the state of the sensor module 976.

In certain embodiments, the sensor module 976 can include a biometric sensor that can obtain biometric information associated with a user, such as fingerprint authentication, iris authentication, face authentication, and voice authentication. The sensor module 976 can also be configured to sense at least one of a pressure of an input associated with a signature of the user, velocity of the input, or a tilt range of the input.

According to an embodiment, the interface 977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 978 may physically connect the electronic device 901 and the electronic device 906. According to an embodiment, the connector 978 may include, for example, an USB connector, an SD card/MMC connector, or an audio connector (e.g., a headphone connector).

The haptic module 979 may convert an electrical signal into mechanical stimulation (e.g., vibration or motion) or into electrical stimulation. For example, the haptic module 979 may apply tactile or kinesthetic stimulation to a user. The haptic module 979 may include, for example, a motor, a piezoelectric element, or an electric stimulator.

The camera module 980 may capture, for example, a still image and a moving picture. According to an embodiment, the camera module 980 may include at least one lens (e.g., a wide-angle lens and a telephoto lens, or a front lens and a rear lens), an image sensor, an image signal processor, or a flash (e.g., a light emitting diode or a xenon lamp).

The power management module 988, which is to manage the power of the electronic device 901, may constitute at least a portion of a power management integrated circuit (PMIC).

The battery 989 may include a primary cell, a secondary cell, or a fuel cell and may be recharged by an external power source to supply power at least one component of the electronic device 901.

The communication module 990 may establish a communication channel between the electronic device 901 and an external device (e.g., the first external electronic device 902, the second external electronic device 904, or the server 908). The communication module 990 may support wired communication or wireless communication through the established communication channel. According to an embodiment, the communication module 990 may include a wireless communication module 992 or a wired communication module 994. The communication module 990 may communicate with the external device through a first network 998 (e.g. a wireless local area network such as Bluetooth or infrared data association (IrDA)) or a second network 999 (e.g., a wireless wide area network such as a cellular network) through a relevant module among the wireless communication module 992 or the wired communication module 994.

The wireless communication module 992 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 992 supports cellar communication, the wireless communication module 992 may, for example, identify or authenticate the electronic device 901 within a communication network using the subscriber identification module (e.g., a SIM card) 996. According to an embodiment, the wireless communication module 992 may include a communication processor (CP) separate from the processor 920 (e.g., an application processor (AP)). In this case, the communication processor may perform at least a portion of functions associated with at least one of components 910 to 996 of the electronic device 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, local wireless communication, or a GNSS communication.

The wired communication module 994 may include, for example, a local area network (LAN) service, a power line communication, or a plain old telephone service (POTS). In certain embodiments, the communication module 990 can receive an electronic document from at least one server, transmit biometric information of the user, and transmit an encrypted signature, electronic document to external server (s).

For example, the first network 998 may employ, for example, Wi-Fi direct or Bluetooth for transmitting or receiving commands or data through wireless direct connection between the electronic device 901 and the first external electronic device 902. The second network 999 may include a telecommunication network (e.g., a computer network such as a LAN or a WAN, the Internet or a telephone network) for transmitting or receiving commands or data between the electronic device 901 and the second electronic device 904.

According to various embodiments, the commands or the data may be transmitted or received between the electronic device 901 and the second external electronic device 904 through the server 908 connected with the second network 999. Each of the first and second external electronic devices 902 and 904 may be a device of which the type is different from or the same as that of the electronic device 901. According to various embodiments, all or a part of operations that the electronic device 901 will perform may be executed by another or a plurality of electronic devices (e.g., the electronic devices 902 and 904 or the server 908). According to an embodiment, in the case that the electronic device 901 executes any function or service automatically or in response to a request, the electronic device 901 may not perform the function or the service internally, but may alternatively or additionally transmit requests for at least a part of a function associated with the electronic device 901 to any other device (e.g., the electronic device 902 or 904 or the server 908). The other electronic device (e.g., the electronic device 902 or 904 or the server 908) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 930).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 930) in the form of a program module. The instruction, when executed by a processor (e.g., the processor 920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch screen;
   a biometric sensor;
   a communication circuit;
   a memory; and
   at least one processor electrically connected to the touch screen, the biometric sensor, the memory, and the communication circuit,
   wherein the memory stores a plurality of instructions that, when executed, causes the processor to:
      receive an electronic document from a first server via the communication circuit;
      based on a determination that the electronic document is received, obtain biometric information via the biometric sensor;
      perform biometric authentication based on the obtained biometric information;
      based on determination that the biometric authentication is completed, transmit information regarding the authenticated biometric information to a second server via the communication circuit;
      receive authentication verification result information from the second server via the communication circuit, the authentication verification result information being corresponding to the transmitted information regarding the authenticated biometric information;
      obtain a signature associated with the electronic document via the touch screen;
      encrypt the obtained signature based on key information, the key information being associated with the biometric authentication; and
      transmit, to the first server, the encrypted signature and the authentication verification result information via the communication circuit,
   wherein the authentication verification result information is used by the first server to verify the biometric authentication.

2. The electronic device of claim 1, wherein the processor is configured to:
   receive, via the communication circuit, information associated with a result of verifying that the encrypted signature corresponds to the signature from the first server, and
   include the signature in the electronic document as at least a portion of the electronic document, based on at least a piece of the received information.

3. The electronic device of claim 2, wherein the processor is further configured to:
   delete information about the obtained signature when the processor does not receive the information associated with the result of verifying that the encrypted signature corresponds to the signature from the first server.

4. The electronic device of claim 1, wherein the signature is encrypted based on a private key included in the key information, and
   wherein the encrypted signature is decryptable based on a public key registered in the first server, wherein the public key is corresponding to the private key.

5. The electronic device of claim 1, wherein the information regarding the authenticated biometric information includes data obtained by encrypting an arbitrary value received from the second server based on the key information.

6. The electronic device of claim 1,
wherein the authentication verification result information includes a one-time token,
wherein the processor is configured to
obtain the signature via the touch screen when the one-time token satisfies a specified condition.

7. The electronic device of claim 6, wherein the one-time token includes a specified valid period of authenticating a user, and
wherein the processor is further configured to authenticate the user by using the one-time token within the specified valid period.

8. The electronic device of claim 6, wherein the processor is further configured to display a user interface (UI) for obtaining the signature via the touch screen, when the one-time token satisfies the specified condition.

9. The electronic device of claim 1, further comprising:
a sensor configured to sense at least one of a pressure of an input associated with the signature, a velocity of the input, or a tilt range of the input,
wherein the processor is configured to:
obtain at least one of the pressure of the input associated with the signature, the velocity of the input, or the tilt range of the input via the sensor as a piece of additional information of the signature;
encrypt the additional information of the signature based on the key information; and
transmit, to the first server, the encrypted additional information together with the encrypted signature and the authentication verification result information via the communication circuit.

10. The electronic device of claim 1, wherein the biometric authentication via the biometric sensor includes at least one of fingerprint authentication, iris authentication, face authentication, and voice authentication.

11. A method of processing a signature, the method comprising:
receiving an electronic document from a first server;
based on a determination that the electronic document is received, obtaining biometric information;
performing biometric authentication based on the obtained biometric information;
based on determination that the biometric authentication is completed, transmitting information regarding the authenticated biometric information to a second server;
receiving authentication verification result information from the second server, the authentication verification result information being corresponding to the transmitted information regarding the authenticated biometric information;
obtaining a signature associated with the electronic document;
encrypting the obtained signature based on key information, the key information being associated with the biometric authentication; and
transmitting, to the first server, the encrypted signature and the authentication verification result information, wherein the authentication verification result information is used by the first server to verify the biometric authentication.

12. The method of claim 11, further comprising:
receiving information associated with a result of verifying that the encrypted signature corresponds to the signature from the first server; and
including the signature in the electronic document as at least a portion of the electronic document, based on the received information.

13. The method of claim 12,
further comprises:
deleting information about the obtained signature when the information associated with the result of verifying that the encrypted signature corresponds to the signature is not received from the first server.

14. The method of claim 11, further comprising:
wherein the authentication verification result information includes a one-time token,
wherein the obtaining the signature includes obtaining the signature when the one-time token satisfies a specified condition.

15. An electronic device comprising
an input device;
a biometric sensor;
a communication circuit;
a memory; and
at least one processor electrically connected to the input device, the memory, the biometric sensor, and the communication circuit,
wherein the memory stores a plurality of instructions that, when executed, causes the at least one processor to:
obtain biometric information via the biometric sensor;
perform biometric authentication based on the obtained biometric information;
based on determination that the biometric authentication is completed, transmit information regarding the authenticated biometric information to a first server via the communication circuit;
receive authentication verification result information from the first server via the communication circuit, the authentication verification result information being corresponding to the transmitted information regarding the authenticated biometric information;
obtain personal identification number (PIN) information via the input device;
encrypt the obtained PIN information based on key information, the key information being associated with the biometric authentication; and
transmit, to a second server, the encrypted PIN information and the authentication verification result information via the communication circuit,
wherein the authentication verification result information is used by the second server to verify the biometric authentication.

16. The electronic device of claim 15, wherein the at least one processor is configured to:
receive, via the communication circuit, information associated with a result of verifying that the encrypted PIN information corresponds to the PIN information input by a user from the second server; and
perform an operation required to authenticate the PIN information based on at least a piece of the received information.

17. The electronic device of claim 15, further comprising:
a display,
wherein the at least one processor is configured to:
receives an electronic document requiring authentication of the PIN information from the second server, and
displays the electronic document on the display based on a verification result.

18. The electronic device of claim 15, wherein the PIN information is encrypted based on a private key included in the key information, and wherein the encrypted PIN information is decryptable based on a public key registered in the second server, wherein the public key is corresponding to the private key.

19. The electronic device of claim 15, wherein the information regarding the authenticated biometric information includes data obtained by encrypting an arbitrary value received from the first server based on the key information.

20. The electronic device of claim 15,
wherein the authentication verification result information includes a one-time token,
wherein the at least one processor is configured to
obtain the PIN information via the input device when the one-time token satisfies a specified condition.

* * * * *